US010723390B2

(12) United States Patent
Salter et al.

(10) Patent No.: US 10,723,390 B2
(45) Date of Patent: Jul. 28, 2020

(54) VEHICLE HOOD STORAGE COMPARTMENT

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Paul Kenneth Dellock, Northville, MI (US); Mark Wisneski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 16/047,359

(22) Filed: Jul. 27, 2018

(65) Prior Publication Data

US 2020/0031401 A1  Jan. 30, 2020

(51) Int. Cl.
| | | |
|---|---|---|
| *B60P 3/00* | (2006.01) | |
| *B62D 25/12* | (2006.01) | |
| *B60R 11/00* | (2006.01) | |
| *B60Q 3/30* | (2017.01) | |
| *E05F 15/60* | (2015.01) | |
| *E05F 7/02* | (2006.01) | |
| *B60H 1/00* | (2006.01) | |
| *E05F 15/79* | (2015.01) | |

(52) U.S. Cl.
CPC ......... *B62D 25/12* (2013.01); *B60H 1/00271* (2013.01); *B60Q 3/30* (2017.02); *B60R 11/00* (2013.01); *E05F 7/02* (2013.01); *E05F 15/60* (2015.01); *E05F 15/79* (2015.01); *B60R 2011/004* (2013.01); *B60R 2011/0098* (2013.01); *E05Y 2900/53* (2013.01)

(58) Field of Classification Search
CPC .......................... B29C 66/71; B65D 33/2591; B65D 33/2508; B29K 2023/06; B29K 2023/065; B62D 25/12; B62D 25/105; E05B 83/24; E05B 81/14; E05Y 2900/536

See application file for complete search history.

(56) References Cited

U.S. PATENT DOCUMENTS

| | | | | |
|---|---|---|---|---|
| 2,253,252 A | * | 8/1941 | Smith ..................... | E05C 19/16 62/267 |
| 4,586,347 A | * | 5/1986 | McCarty ............... | F25D 17/065 62/265 |
| 5,209,082 A | * | 5/1993 | Ha ........................ | F25D 23/025 312/236 |
| 5,359,795 A | * | 11/1994 | Mawby .................. | B29C 44/12 40/405 |
| 5,966,963 A | * | 10/1999 | Kovalaske ............. | F25D 23/02 312/405 |

(Continued)

FOREIGN PATENT DOCUMENTS

| | | |
|---|---|---|
| DE | 102005059264 | 5/2007 |
| DE | 102011122321 | 6/2013 |

(Continued)

*Primary Examiner* — Kiran B Patel
(74) *Attorney, Agent, or Firm* — David Coppiellie; Carlson, Gaskey & Olds, P.C.

(57) ABSTRACT

A vehicle hood is disclosed and is movable to access an engine compartment. A compartment defining a storage space is accessible through a lid within the closure panel. The compartment includes a temperature control system maintaining a temperature within the storage space.

15 Claims, 5 Drawing Sheets

(56) References Cited

U.S. PATENT DOCUMENTS

| | | | | |
|---|---|---|---|---|
| 6,055,823 | A * | 5/2000 | Baker | F25D 17/065 |
| | | | | 62/265 |
| 7,059,693 | B2 * | 6/2006 | Park | E05B 17/0037 |
| | | | | 312/321.5 |
| 7,108,342 | B2 * | 9/2006 | Shin | F25D 23/04 |
| | | | | 312/405 |
| 7,254,958 | B2 * | 8/2007 | Kim | F25D 23/04 |
| | | | | 312/292 |
| 7,360,278 | B2 * | 4/2008 | Jang | E05F 1/1016 |
| | | | | 16/348 |
| 7,455,085 | B2 * | 11/2008 | Voglewede | F25D 23/126 |
| | | | | 141/18 |
| 7,607,743 | B2 * | 10/2009 | Jang | F25D 23/028 |
| | | | | 312/404 |
| 8,225,458 | B1 * | 7/2012 | Hoffberg | E05F 3/102 |
| | | | | 16/49 |
| 8,287,061 | B2 * | 10/2012 | Ha | F25D 23/02 |
| | | | | 312/405 |
| 8,408,664 | B2 * | 4/2013 | Park | F25D 23/02 |
| | | | | 312/405 |
| 8,424,985 | B2 * | 4/2013 | Kwon | F25D 23/02 |
| | | | | 312/292 |
| 8,726,689 | B2 * | 5/2014 | Jang | F25D 11/006 |
| | | | | 62/404 |
| 8,752,918 | B2 * | 6/2014 | Kang | F25D 23/025 |
| | | | | 312/405.1 |
| 8,944,534 | B2 * | 2/2015 | Lim | F25D 23/028 |
| | | | | 312/292 |
| 9,170,045 | B2 * | 10/2015 | Oh | F25D 23/02 |
| 9,409,525 | B2 | 8/2016 | Gillam et al. | |
| 9,841,224 | B2 * | 12/2017 | Hitzelberger | F25D 23/04 |
| 9,863,171 | B1 * | 1/2018 | Salter | B60R 7/04 |
| 9,976,789 | B2 * | 5/2018 | Grepper | F25D 3/08 |
| 10,005,609 | B1 * | 6/2018 | Biene | B65D 81/38 |
| 10,207,850 | B2 * | 2/2019 | Sanfilippo | B65D 75/5838 |
| 2003/0102688 | A1 * | 6/2003 | Bingle | E05B 83/26 |
| | | | | 296/76 |
| 2004/0231355 | A1 * | 11/2004 | Mayer | C09K 5/063 |
| | | | | 62/371 |
| 2005/0188715 | A1 * | 9/2005 | Aragon | F25D 3/125 |
| | | | | 62/371 |
| 2007/0084232 | A1 * | 4/2007 | Whewell, Jr. | F25D 3/122 |
| | | | | 62/384 |
| 2007/0193297 | A1 * | 8/2007 | Wilson | F25D 29/00 |
| | | | | 62/371 |
| 2007/0224077 | A1 * | 9/2007 | Cox | A61L 11/00 |
| | | | | 422/1 |
| 2011/0031771 | A1 | 2/2011 | Ding | |
| 2011/0241371 | A1 * | 10/2011 | Hipshier | B60R 7/04 |
| | | | | 296/24.3 |
| 2011/0289939 | A1 * | 12/2011 | Lu | F25B 21/04 |
| | | | | 62/3.3 |
| 2013/0153316 | A1 * | 6/2013 | Stuckey | B60H 1/00278 |
| | | | | 180/68.5 |
| 2018/0009588 | A1 * | 1/2018 | Grogan | F25B 21/04 |
| 2018/0023865 | A1 * | 1/2018 | Ilercil | F25B 21/02 |
| | | | | 62/3.62 |
| 2018/0037169 | A1 * | 2/2018 | Dunham | B60Q 3/225 |
| 2018/0069426 | A1 * | 3/2018 | Salter | B60Q 3/18 |
| 2018/0099602 | A1 * | 4/2018 | Salter | G09F 13/22 |
| 2018/0283762 | A1 * | 10/2018 | Fujii | F25D 11/00 |
| 2018/0320947 | A1 * | 11/2018 | Jain | F25D 3/06 |
| 2019/0009710 | A1 * | 1/2019 | Salter | B60N 3/104 |
| 2019/0017742 | A1 * | 1/2019 | Post | F25D 29/008 |
| 2019/0128043 | A1 * | 5/2019 | Ren | E05D 15/56 |
| 2019/0301794 | A1 * | 10/2019 | Esser | F25D 3/06 |

FOREIGN PATENT DOCUMENTS

| | | |
|---|---|---|
| FR | 2629416 | 11/1990 |
| JP | 2009292391 | 12/2009 |

* cited by examiner

VEHICLE HOOD STORAGE COMPARTMENT

TECHNICAL FIELD

This disclosure relates to a storage compartment within a movable closure panel such as a hood of a motor vehicle.

BACKGROUND

Storage space within a vehicle is a consideration for consumers. Typically, storage space is provided within a vehicle cabin or within a trunk. However, the use of space within a vehicle cabin is usually provided by sacrificing passenger space. Moreover, the storage space provided in a vehicle trunk can be inconvenient for smaller items. Moreover, some vehicles, such as pick-up trucks do not have a trunk and therefore require additional covers or structures to provide a secured storage space.

SUMMARY

A closure panel for a motor vehicle according to an exemplary aspect of the present disclosure includes, among other things, a movable closure panel, a compartment defining a storage space proximate the closure panel, a temperature control system maintaining a temperature within the storage space and a lid disposed within the closure panel covering the storage space.

In a further non-limiting embodiment of the foregoing closure panel for a motor vehicle, including a pivoting mechanism for moving lid between closed and open positions.

In a further non-limiting embodiment of any of the foregoing closure panels, including a motor coupled to the pivoting mechanism for moving the lid between the closed and open positions.

In a further non-limiting embodiment of any of the foregoing closure panels, the pivoting mechanism includes a lift portion that lifts the lid away from the compartment.

In a further non-limiting embodiment of any of the foregoing closure panels, the pivoting mechanism includes a rotating portion that rotates the lid away from the compartment.

In a further non-limiting embodiment of any of the foregoing closure panels, a controller is provided for controlling operation of the pivoting mechanism responsive to receipt of an access authorization input.

In a further non-limiting embodiment of any of the foregoing closure panels, a keypad is mounted proximate the compartment on the movable closure panel, the keypad providing an access authorization input to the controller.

In a further non-limiting embodiment of any of the foregoing closure panels, the controller is configured to receive signals from a wireless communication device through a communication link with the vehicle.

In a further non-limiting embodiment of any of the foregoing closure panels, the controller is configured to automatically move the lid to a closed position responsive to one of an expiration of a period of time.

In a further non-limiting embodiment of any of the foregoing closure panels, the temperature control system includes at least one vent for circulating airflow into and out of the storage space.

In a further non-limiting embodiment of any of the foregoing closure panels, including a fan driving airflow through the at least one vent.

In a further non-limiting embodiment of any of the foregoing closure panels, the temperature control system includes a heater portion for maintaining the temperature within the storage space within a predefined temperature range.

In a further non-limiting embodiment of any of the foregoing closure panels, further including padding within the storage space for holding objects.

In a further non-limiting embodiment of any of the foregoing closure panels, further comprising a light illuminating the storage space.

In a further non-limiting embodiment of any of the foregoing closure panels, wherein the movable closure panel is a vehicle hood that covers an engine compartment.

A method of operating a compartment defining a storage space within a vehicle hood according to another exemplary aspect of the present disclosure includes, among other things, sensing a temperature within a compartment proximate a vehicle hood with a sensor and actuating one of a vent fan and a heater to maintain the temperature within the compartment within a predefined temperature range.

In a further non-limiting embodiment of the foregoing method, including controlling a pivoting mechanism to close a lid covering the compartment responsive to an expiration of predefined period of time.

In a further non-limiting embodiment of any of the foregoing methods including opening a lid covering the compartment responsive to one of input of code into a keypad accessible on the vehicle hood and receipt by a controller of a wireless signal from a device in communication with the vehicle.

The various features and advantages of this disclosure will become apparent to those skilled in the art from the following detailed description. The drawings that accompany the detailed description can be briefly described as follows.

DETAILED DESCRIPTION

Figure 1:
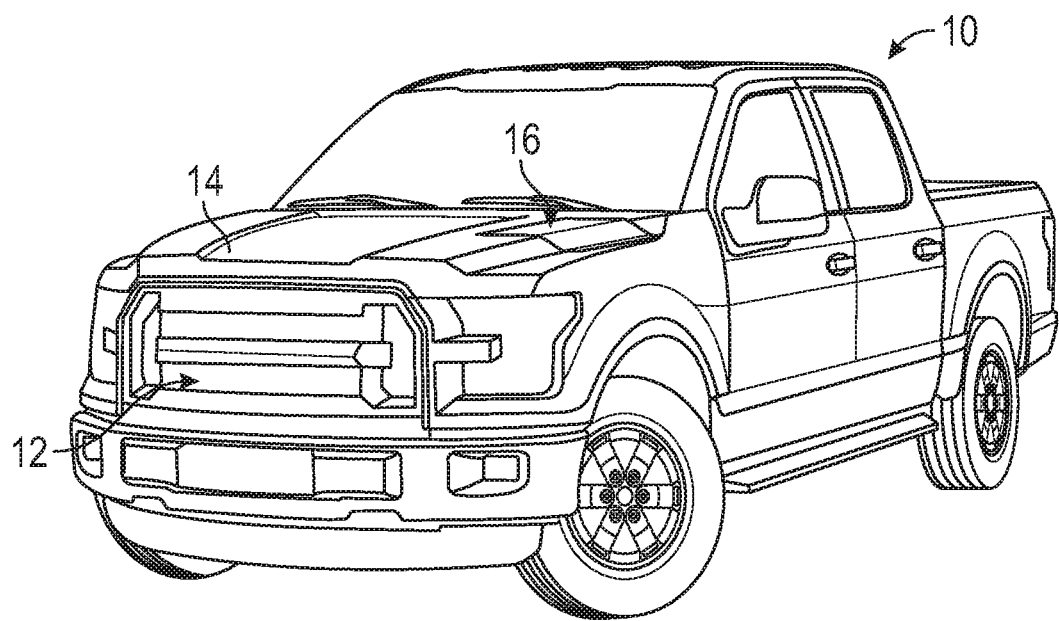
FIG. 1 is a schematic view of an example vehicle including a hood storage compartment.
Figure 2:
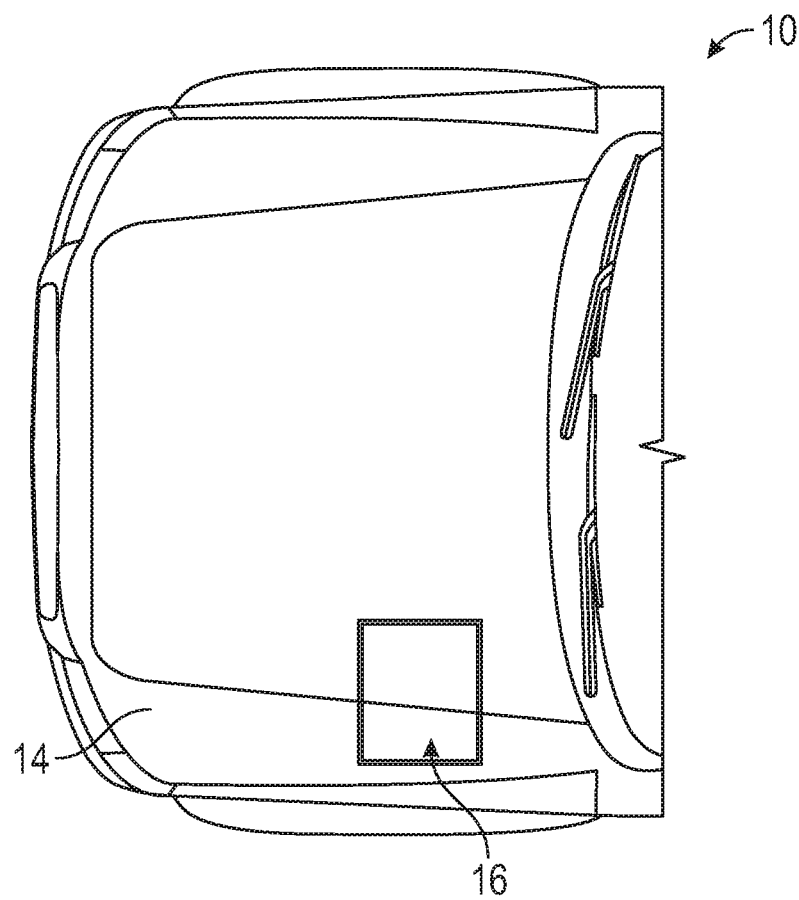
FIG. 2 is a top view of the example vehicle hood storage compartment.
Figure 3:
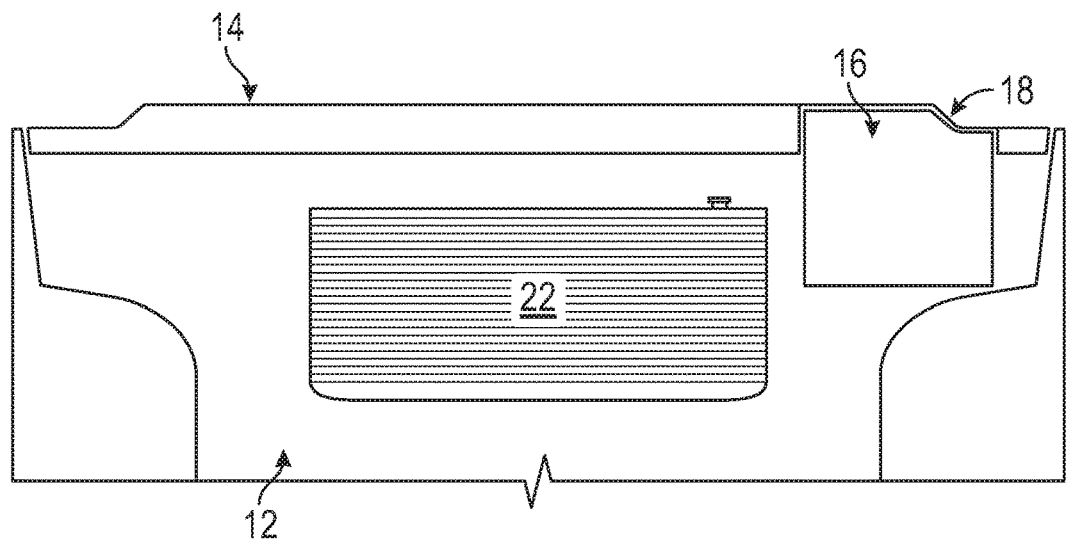
FIG. 3 is a schematic cross-section of the example vehicle hood storage compartment.

Referring to FIGS. 1, 2 and 3, an example motor vehicle 10 includes an engine compartment 12 and a hood 14 including a storage compartment 16. The storage compartment 16 is provided proximate the vehicle hood 14 and accessible through a lid 18 within the vehicle hood 14. The storage compartment 16 may also be a part of the hood 14 and move with the hood 14 is moved between open and closed position when it is desired to access the engine compartment 12. The compartment 16 may also be fixed relative to the hood 14 with access through the lid 18. The example storage compartment 16 is disposed within a space within the engine compartment or a body panel proximate to the engine compartment.

Figure 4:
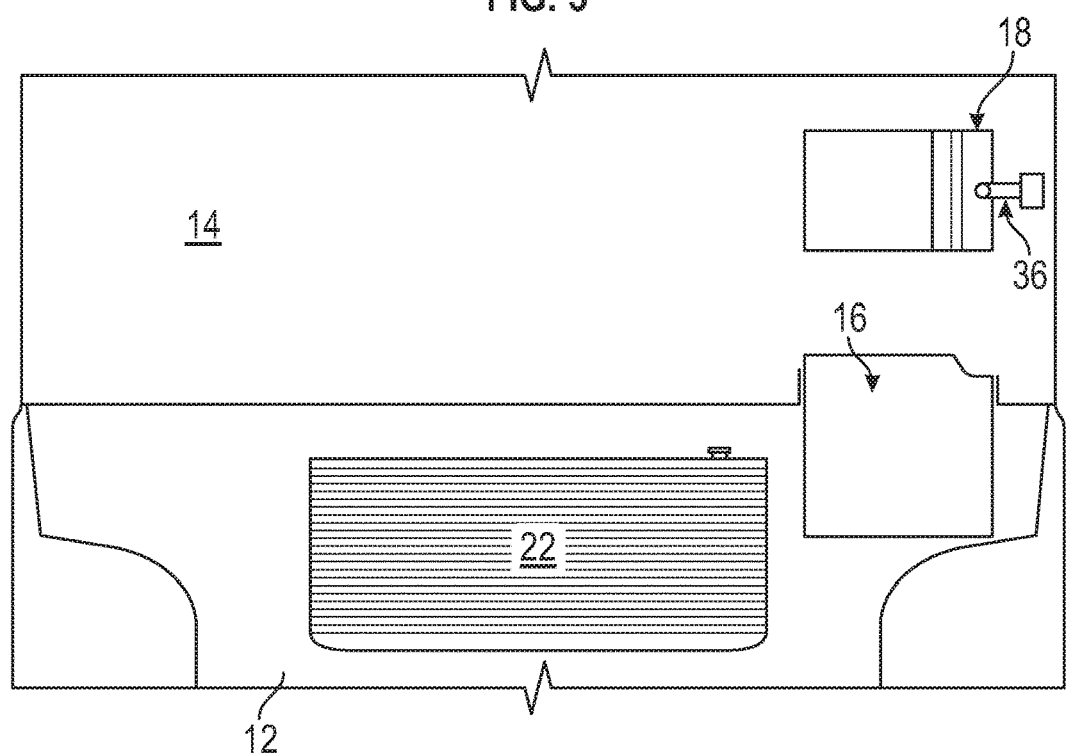
FIG. 4 is a schematic cross-section of the example vehicle hood storage compartment with the vehicle hood in an open position.

Referring to FIG. 4 with continued reference to FIGS. 2 and 3, the hood 14 is illustrated in an open position. In the open position, the lid 18 is lifted with the hood 14 such that the compartment 16 is uncovered and accessible. The lid 18 along with a pivoting mechanism 36 that moves the lid 18. When the hood 14 is in the closed position as is illustrated in FIG. 3, the lid 18 is movable to enable access to the compartment 16 without opening the hood 14.

Figure 5:
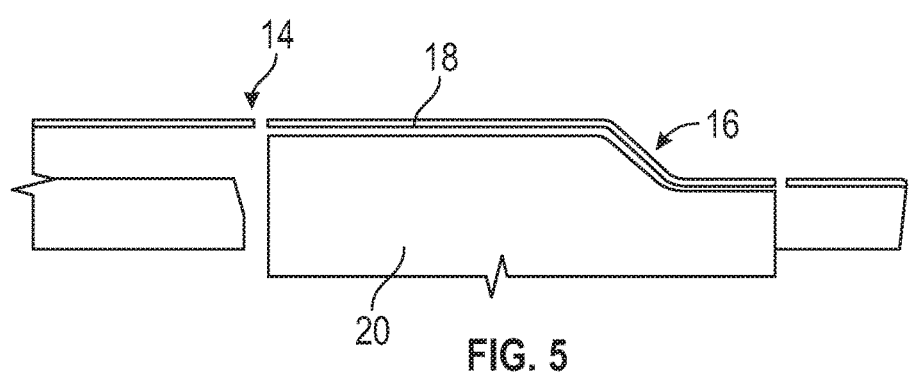
FIG. 5 is an enlarged cross-sectional view of the example hood storage compartment.
Figure 6:
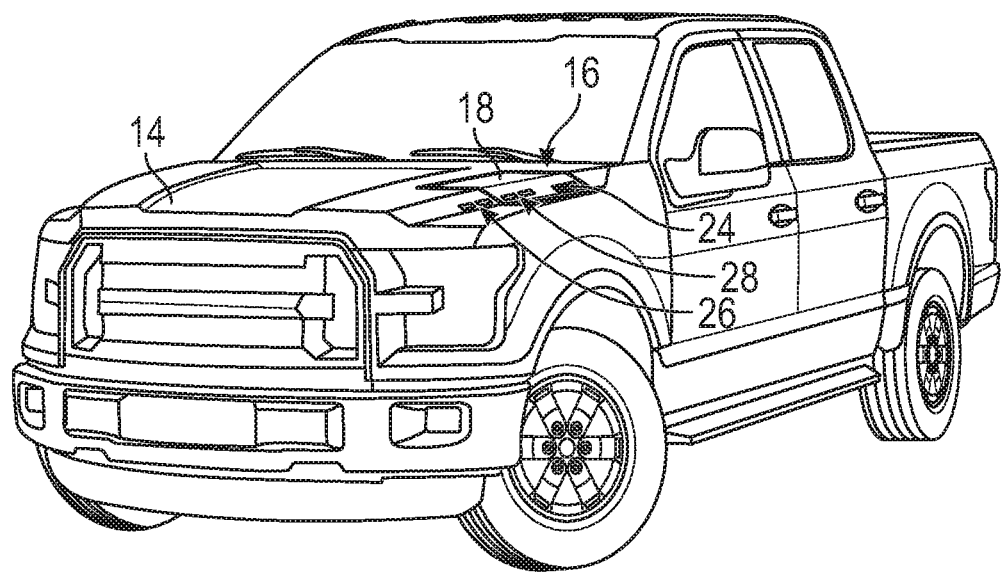
FIG. 6 is a perspective view of the example hood storage compartment.

Referring to FIGS. 5 and 6 with continued reference to FIGS. 1-4, a lid 18 is provided in the hood 14 that covers and secures a storage space 20 defined by the storage compartment 16. The lid 18 includes features that enable it to be automatically opened and closed and controls access by way of authentication devices. In this disclosed example, the lid 18 has a keypad 24 that is accessible from an exterior of the vehicle 10. The keypad 24 may be a capacitive keypad mounted on a plastic access panel on the lid 18. The keypad 24 maybe dead fronted to match the color of the hood 14 or covered with a dark plastic. The dead fronted keypad 24 would be activated in response to detection of hand movements near the keypad 24, or with a first touch. A code entered into the keypad 24 enables operation and opening of the lid 18.

The lid 18 also includes exhaust openings 28 that correspond with vent openings 26 disposed within the hood 14. The openings 26 and 28 enable air circulation through the storage space 20 to maintain conditions within the storage compartment 16.

Figure 7:
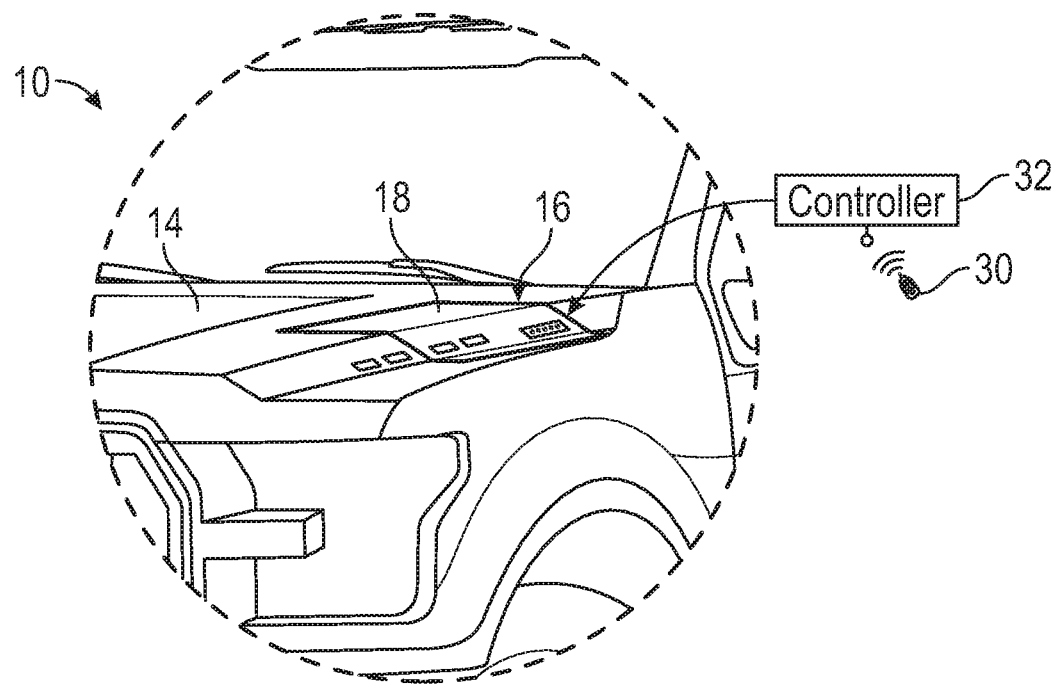
FIG. 7 is an example view of the hood storage compartment in a closed position.

Referring to FIG. 7, the example storage compartment 16 is shown in a closed position with the lid 18 substantially conforming to the outer surface of the vehicle hood 14. The lid 18 in this example is formed to conform to contours of the hood 14 to provide an integrated unobtrusive appearance. The key pad 24 can be substantially hidden by having a color and texture that conforms to the finish of the hood 14. The key pad 24 may be configured to light up responsive to a first touch or proximity to further conceal the presence of the storage compartment 16.

Operation of the lid 18 is controlled by a controller 32. The controller 32 may be a dedicated controller for the storage compartment or may be part of an overall vehicle controller. The controller 32 is programmed and configured to receive signals from either the keypad 24 or from a wireless communication device schematically shown at 30. In one example the wireless communication device 30 may be a key fob for the vehicle 10. In another example, the wireless communication device 30 may be a cell phone or other mobile communication device that can communicate with the controller 32. The example lid 18 is movable in a way that eases access to the storage space 20 and that does not require an operator to hold the lid 18 in an open position.

Figure 8:
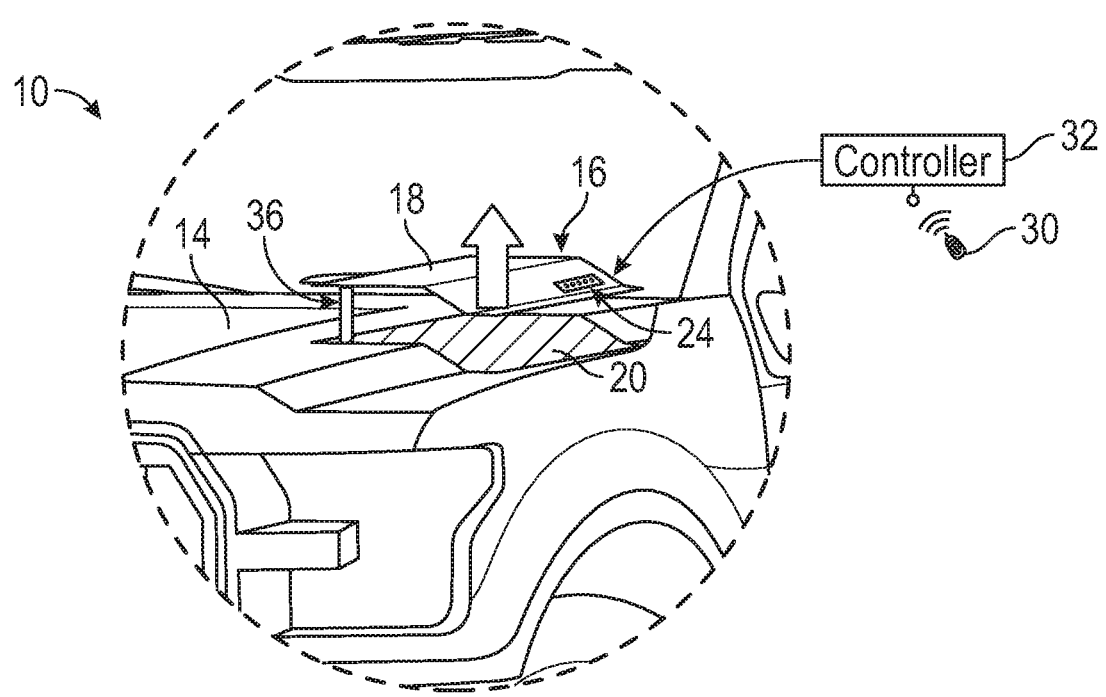
FIG. 8 is a schematic view of a lid of the hood storage compartment in a partially open position.
Figure 9:
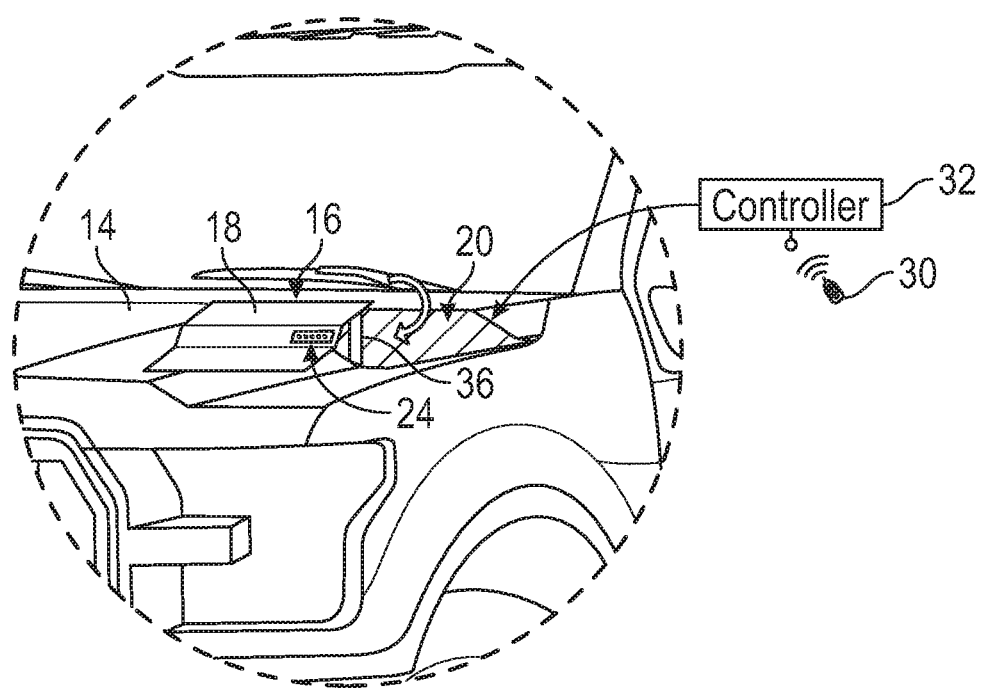
FIG. 9 is a schematic view of the lid of the hood storage compartment an open position.

Referring to FIGS. 8 and 9, with continued reference to FIG. 7, the example the lid 18 moves upward through the use of the pivoting mechanism schematically shown at 36. The pivoting mechanism 36 raises the lid 18 and then rotates the lid 18 away from the storage space 20 as is shown in FIG. 8. Rotation of the lid 18 away from the storage space 20 enables easier access to items stored therein. Movement of the lid 18 with the pivoting mechanism 36 is response to commands from the controller 32 responsive to receipt of an approved authorization code or prompt.

It should be appreciated, that the opening movement disclosed in FIGS. 7, 8 and 9 is a disclosed example and other pivoting movements of the lid 18 are within the contemplation and scope of this disclosure. Moreover, the lid 18 may be opened in other manners as are known and understood.

Figure 10:
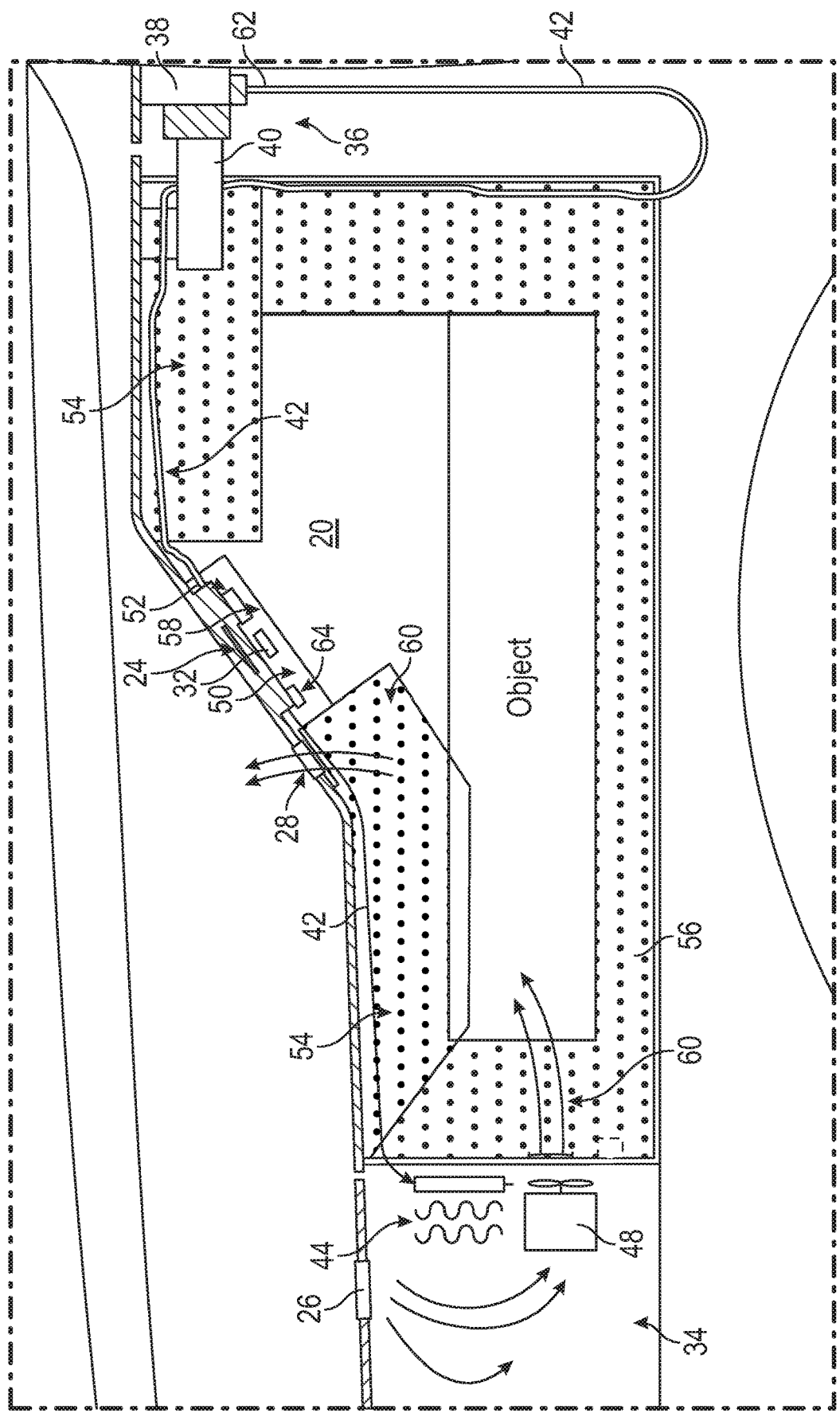
FIG. 10 is a schematic sectional view of the example hood storage compartment.

Referring to FIG. 10 with continued reference to FIGS. 4, 5 and 6, the example storage compartment 16 is shown in cross-section and includes the interior storage space 20. The example storage space 20 is lined with padding to cushion and hold objects in place. In this example, the padding is in the form of large cell foam portions 54 and 56. The foam portion 54 is provided on the lid 18 and the foam portion 56 is provided on the fixed surfaces of the compartment 16.

The pivoting mechanism 36 includes an electric motor 38 that drives a shaft 40 attached to the lid 18. The motor 38 may include a gear box that provides the articulation of the shaft 40 to lift and rotate the lid 18. The disclosed pivoting mechanism 36 is schematically shown and may be configured differently than shown as well as include additional components and mechanisms to provide the desired articulated movement. A load sensor 62 may be provided as part of the pivoting mechanism 36 to detect when the lid 18 is attempting to close against an object. The load sensor 62 may also be part of the motor 38 and detect an obstruction by way of a motor speed change or current change that is indicative of an increased load on the motor 38. The increased load sensed by the load sensor 62 provides an indication that an object is blocking closure of the lid 18. In response to a blockage being detected, the closing operation can be stopped and reversed and an alert in the form of an indicator light or audible signal could be provided to the operator. Accordingly, other pivoting mechanism configurations are within the contemplation and scope of this disclosure.

A temperature control system 34 is provided to maintain a temperature within the storage space 20. The temperature within the storage space 20 in the disclosed example embodiment is maintained within a predefined temperature range. The temperature range is defined to prevent damage to objects within the storage space 20. As appreciated, the hood 14 and engine compartment 12 are exposed to extremes of temperature and therefore the example compartment includes the temperature control system 34 to safe guard stored objects. The temperature within the space 20 could be set by a control within the vehicle or by programming accessible through a wireless device such as an authorized cell phone linked to the vehicle.

The example temperature control system 44 includes a motor 48 that drives a fan to provide airflow 60 from through the storage space 20. Airflow 60 is schematically shown at 60 and flows through the large cell foam portions 56, 54 and through the vents 26, 28. Airflow 60 provides a cooling airflow when required to maintain the space 20 within the predefined temperature range. A heater 44 is schematically shown and enables heating of the airflow 60 to elevate the temperature within the space 20 as needed. A temperature sensor 64 can be used to communicate the temperature so that the controller 32 can prompt operation of the heater 44 or fan 48 as required to maintain the desired temperature. In this example, the temperature control system 44 is provided within the hood 14, but outside the space 20. However, the temperature control system 44 could be configured differently and other such configurations are within the contemplation and scope of this disclosure.

The disclosed example storage compartment 16 includes a printed circuit board (PCB) 50 that performs as the controller 32 and is mounted to an underside of the lid 18. The PCB 50 controls operation of the pivoting mechanism 36 and the temperature control system 34. The PCB 50 is electrically coupled to both systems 34, 36 through a wire harness 42. The wire harness 42 is shown schematically and includes the electrical leads needed to control and power the systems 34, 36. Mounting of the PCB 50 on the lid 18 saves assembly and manufacturing costs.

The PCB 50 may include a light 52 to illuminate the space 20. In this example, the light 52 is a light emitting diode and is mounted with the PCB 50. A cover 58 may be provided to protect the PCB 50 and the light 52. The lid 18 may be operable according to different operating conditions and optional access configuration. In one example, detection of hand gesture near the keypad 24 when the lid is open may prompt the lid 18 to move to a closed position. Another control prompt may in include detection of a wireless communication device such as the vehicle key fob 30 proximate the compartment 16. Alternatively, the key fob 30 may include a prompt to prompt the controller 32 to open the lid 18.

Accordingly, the example hood storage compartment 16 provides features to restrict access to the interior storage space while also maintaining a desired temperature within the storage space to maintain objects stored therein.

Although the different non-limiting embodiments are illustrated as having specific components or steps, the embodiments of this disclosure are not limited to those particular combinations. Moreover, this disclosure is not just a material specification and it is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A closure panel for a motor vehicle comprising:
   a hood that covers an engine compartment;
   a compartment defining a storage space proximate the hood closure panel;
   a temperature control system maintaining a temperature within the storage space; and
   a lid disposed within the hood covering the storage space;
   a pivoting mechanism for moving the lid between closed and open positions; and
   a motor coupled to the pivoting mechanism for moving the lid between the closed and open positions.

2. The closure panel as recited in claim 1, wherein the pivoting mechanism includes a lift portion that lifts the lid away from the compartment.

3. The closure panel as recited in claim 2, wherein the pivoting mechanism includes a rotating portion that rotates the lid away from the compartment.

4. The closure panel as recited in claim 1, including a controller for controlling operation of the pivoting mechanism responsive to receipt of an access authorization input.

5. The closure panel as recited in claim 4, including a keypad mounted proximate the compartment on the movable closure panel, the keypad providing an access authorization input to the controller.

6. The closure panel as recited in claim 4, wherein the controller is configured to receive signals from a wireless communication device through a communication link with the vehicle.

7. The closure panel as recited in claim 4, wherein the controller is configured to automatically move the lid to a closed position responsive to one of an expiration of a period of time.

8. The closure panel as recited in claim 1, wherein the temperature control system includes at least one vent for circulating airflow into and out of the storage space.

9. The closure panel as recited in claim 8, including a fan driving airflow through the at least one vent.

10. The closure panel as recited in claim 8, wherein the temperature control system includes a heater portion for maintaining the temperature within the storage space within a predefined temperature range.

11. The closure panel as recited in claim 1, further comprising padding within the storage space for holding objects.

12. The closure panel as recited in claim 1, further comprising a light illuminating the storage space.

13. A method of operating a compartment defining a storage space within a vehicle hood, the method comprising:
   sensing a temperature within a compartment disposed proximate a vehicle hood with a sensor;
   controlling a pivoting mechanism to open and close a lid covering the compartment; and
   actuating one of a vent fan and a heater to maintain the temperature within the compartment within a predefined temperature range.

14. The method as recited in claim 13, including controlling the pivoting mechanism to close a lid covering the compartment responsive to an expiration of predefined period of time.

15. The method as recited in claim 13, including opening the lid covering the compartment responsive to one of input of code into a keypad accessible on the vehicle hood and receipt by a controller of a wireless signal from a device in communication with the vehicle.

* * * * *